United States Patent
Kajita (10) Patent No.: US 11,548,325 B2
(45) Date of Patent: Jan. 10, 2023

(54) PNEUMATIC TIRE

(71) Applicant: SUMITOMO RUBBER INDUSTRIES, LTD., Hyogo (JP)

(72) Inventor: Hisataka Kajita, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 632 days.

(21) Appl. No.: 16/189,386

(22) Filed: Nov. 13, 2018

(65) Prior Publication Data

US 2019/0168548 A1  Jun. 6, 2019

(30) Foreign Application Priority Data

Dec. 6, 2017 (JP) .............................. JP2017-234528

(51) Int. Cl.
*B60C 15/024* (2006.01)
*B60C 15/04* (2006.01)
*B60C 15/00* (2006.01)
*B60C 15/06* (2006.01)

(52) U.S. Cl.
CPC ............ *B60C 15/024* (2013.01); *B60C 15/00* (2013.01); *B60C 15/04* (2013.01); *B60C 2015/0245* (2013.01); *B60C 2015/0614* (2013.01); *B60C 2200/10* (2013.01)

(58) Field of Classification Search
CPC ............ B60C 15/04; B60C 2015/0614; B60C 15/024

See application file for complete search history.

(56) References Cited

U.S. PATENT DOCUMENTS

| 5,885,388 A * | 3/1999 | Ueyoko | B60C 15/0607 152/540 |
| 6,505,662 B2 | 1/2003 | Mori et al. | |
| 2006/0102270 A1* | 5/2006 | Suzuki | D07B 1/0606 152/542 |
| 2012/0097310 A1* | 4/2012 | Potier | B60C 15/024 152/539 |

(Continued)

FOREIGN PATENT DOCUMENTS

| EP | 3323642 A1 | 5/2018 |
| JP | 57158105 | * 9/1982 |
| JP | S59-124415 A | 7/1984 |

(Continued)

OTHER PUBLICATIONS

JP 57158105 machine translation (Year: 1982).*

(Continued)

*Primary Examiner* — Timothy Kennedy
*Assistant Examiner* — Alexander A Wang
(74) *Attorney, Agent, or Firm* — Greenblum & Bernstein, P.L.C.

(57) ABSTRACT

A pneumatic tire comprises bead portions each having a bead core therein. Each of the bead portions has an outer side surface which is to be in contact with a standard rim on an outer side in a tire axial direction of the bead core. In a tire meridian section of the pneumatic tire in a pre-mounted state, a distance in a tire radial direction between an inner end in a tire radial direction of the bead core and a bead toe is larger than 0.5 times and smaller 2.5 times a maximum width in the tire axial direction of the bead core.

18 Claims, 4 Drawing Sheets

(56) References Cited

U.S. PATENT DOCUMENTS

| 2013/0137807 | A1* | 5/2013 | Miyazaki | C08L 81/02 |
| | | | | 524/332 |
| 2018/0134097 | A1 | 5/2018 | Isaka | |

FOREIGN PATENT DOCUMENTS

| JP | H02-147404 A | 6/1990 |
| JP | 3192026 B2 | 7/2001 |
| JP | 4926314 B2 | 5/2012 |
| JP | 2014012469 * | 1/2014 |

OTHER PUBLICATIONS

JP 2014012469 machine translation (Year: 2014).*
Official Communication issued in European Patent Office (EPO) Patent Application No. 18196565.8, dated May 15, 2019.

* cited by examiner

PNEUMATIC TIRE

TECHNICAL FIELD

The present invention relates to a pneumatic tire having bead cores.

BACKGROUND ART

Conventionally, in a pneumatic tire, due to a large lateral force exerted during cornering, bead portions displace in a tire axial direction on rims, therefore, steering stability is deteriorated, for example. In order to suppress such displacement of the bead portions, it is possible to increase the contact between the rim and the bead portions by increasing the tightening force onto the rim, for example.

However, such a pneumatic tire has a problem that it is difficult to mount the bead portions on the rim, and engagement property between the bead portions and the rim is easily deteriorated. Note that Japanese Patent No. 4926314 discloses a technique for improving the engagement property between the bead portions and the rim.

SUMMARY OF THE INVENTION

The present invention was made in view of the above, and a primary object thereof is to provide a pneumatic tire capable of improving engagement property between the bead portions and the rim and the steering stability in a good balance.

In one aspect of the present invention, a pneumatic tire comprises a pair of bead portions each having a bead core therein, wherein each of the pair of the bead portions has an outer side surface which is to be in contact with a standard rim on an outer side in a tire axial direction of the respective one of the bead cores, in a tire meridian section of the pneumatic tire in a pre-mounted state in which a width between the outer side surfaces is equal to a rim width of the standard rim, in at least one of the pair of the bead portions, a distance (H) in a tire radial direction between an inner end in the tire radial direction of the bead core and a bead toe is larger than 0.5 times and smaller 2.5 times a maximum width (Y) in the tire axial direction of the bead core.

In another aspect of the invention, it is preferred that a width in the tire axial direction of each of the bead cores increases radially outwardly from the inner end of respective one of the bead cores.

In another aspect of the invention, it is preferred that the distance (H) is larger than 0.8 times and smaller than 2.0 times the maximum width (Y).

In another aspect of the invention, it is preferred that a distance (X) between the inner end in the tire axial direction of the bead core and the bead toe is larger than 0.3 times and smaller than 2.0 times the maximum width (Y).

In another aspect of the invention, it is preferred that a minimum length in the tire axial direction between the bead core and the outer side surface is in a range of from 10% to 25% of the maximum width (Y).

DESCRIPTION OF THE PREFERRED EMBODIMENT

An embodiment of the present invention will now be described below in detail in conjunction with accompanying drawings.

Figure 1:
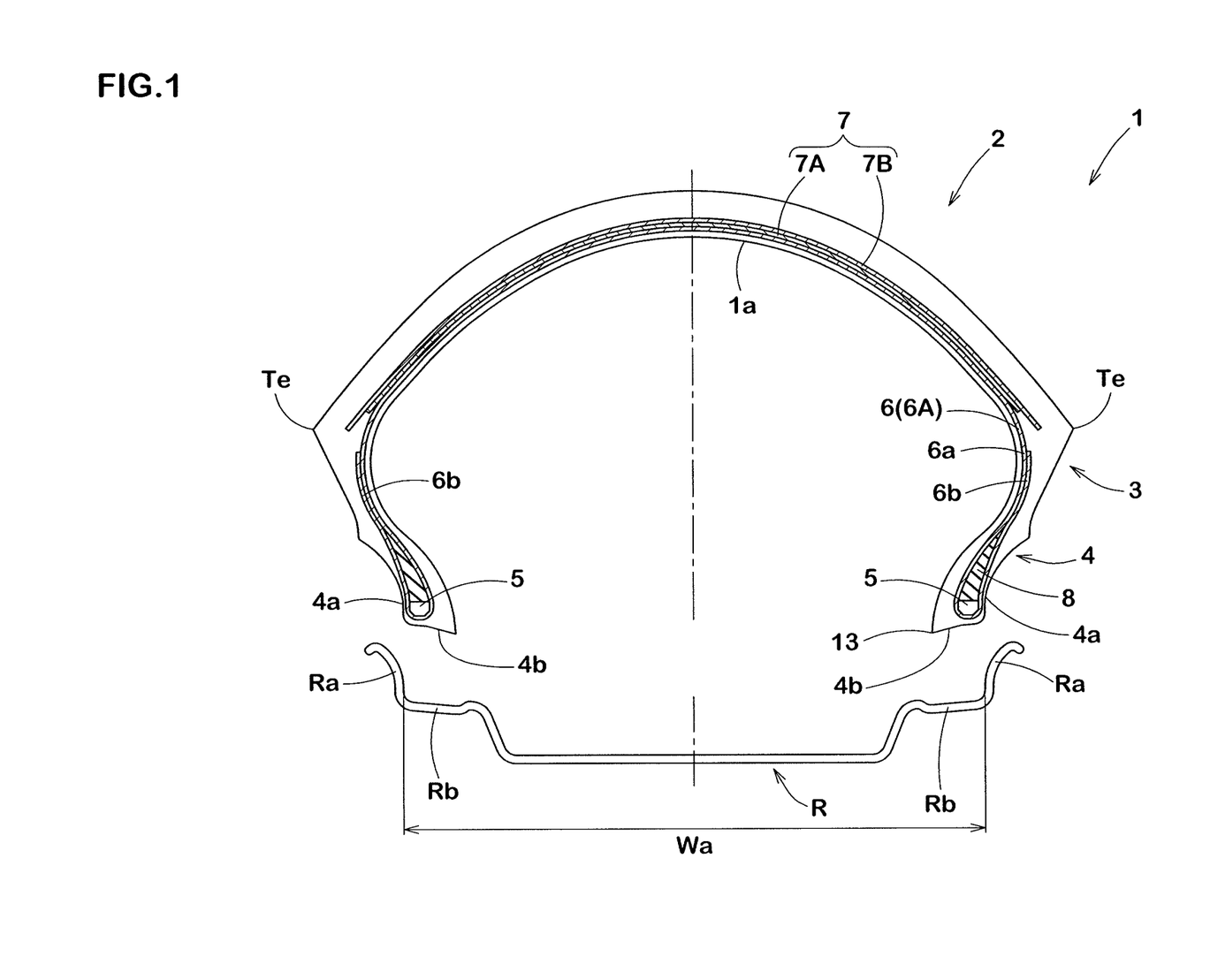
FIG. 1 is a cross-sectional view of a pneumatic tire in a pre-mounted state according to an embodiment of the present invention.

FIG. 1 is a tire meridian section passing through a tire rotational axis (not shown) of a pneumatic tire (hereinafter may be simply referred to as "tire") 1 according to an embodiment of the present invention in a pre-mounted state. In this embodiment, a tire for a motorcycle is shown as a preferred example of the tire 1. Note that the tire 1 of the present invention is not limited to a tire for a motorcycle.

The tire 1 in this embodiment includes a carcass 6 extending between bead cores 5 of bead portions 4 via a tread portion 2 and sidewall portions 3, and a belt layer 7 arranged on an outer side in a tire radial direction of the carcass 6.

The carcass 6 is formed of at least one, one in this embodiment, carcass ply 6A. The carcass ply 6A includes a main body portion (6a) extending between a pair of the bead cores 5 in a toroidal manner and a pair of turned up portions (6b) arranged continuously to both ends of the main body portion (6a) and each turned up around respective one of the bead cores 5 from inside to outside in the tire axial direction. Bead apex rubber 8 for increasing rigidity of the bead portions 4 is provided between the main body portion (6a) and each of the turned up portions (6b).

The belt layer 7 is arranged in the inside of the tread portion 2 and extends to the vicinity of the tread edges (Te) on both sides. The belt layer 7 in this embodiment is formed of two belt plies 7A and 7B arranged respectively on an inner side and an outer side in the tire radial direction.

In the present specification, the "pre-mounted state" refers to a state in which the bead portions 4 are held so that a distance between outer side surfaces (4a) of the bead portions 4 is equal to a rim width (Wa) of a standard rim (hereinafter, may be simply referred to as "rim") (R), wherein the outer side surfaces (4a) are each to be in contact with the rim (R) on an outer side in the tire axial direction of respective one of the bead cores 5. Hereinafter, unless otherwise noted, dimensions and the like of various parts of the tire 1 are those measured in this pre-mounted state.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

Each of the bead portions 4 in this embodiment includes the outer side surface (4a) and a bead bottom surface (4b) connected to the outer side surface (4a) and to be in contact with a base portion (Ra) of the rim (R). The outer side surfaces (4a) in this embodiment are to be in contact with flange portions (Rb) of the rim (R) positioned on an outer side in the tire radial direction of a bead base line (not shown) and extending in the tire radius direction.

Each of the bead bottom surfaces (4b) in this embodiment includes a bead toe 13 which is an innermost end in the tire radial direction and an innermost end in the tire axial direction of respective one of the bead portions 4 and extends obliquely and radially outwardly from the bead toe 13 toward the outer side in the tire axial direction. Each of the bead bottom surfaces (4*b*) in this embodiment is formed in a smooth arc shape convex toward the outer side in the tire radial direction. Each of the bead bottom surfaces (4*b*) is formed by a plurality of arcuate shapes with decreasing radii of curvature from the bead toe 13 toward the outer side in the tire axial direction, for example. Note that the bead bottom surfaces (4*b*) are not limited to such an embodiment.

Figure 2:
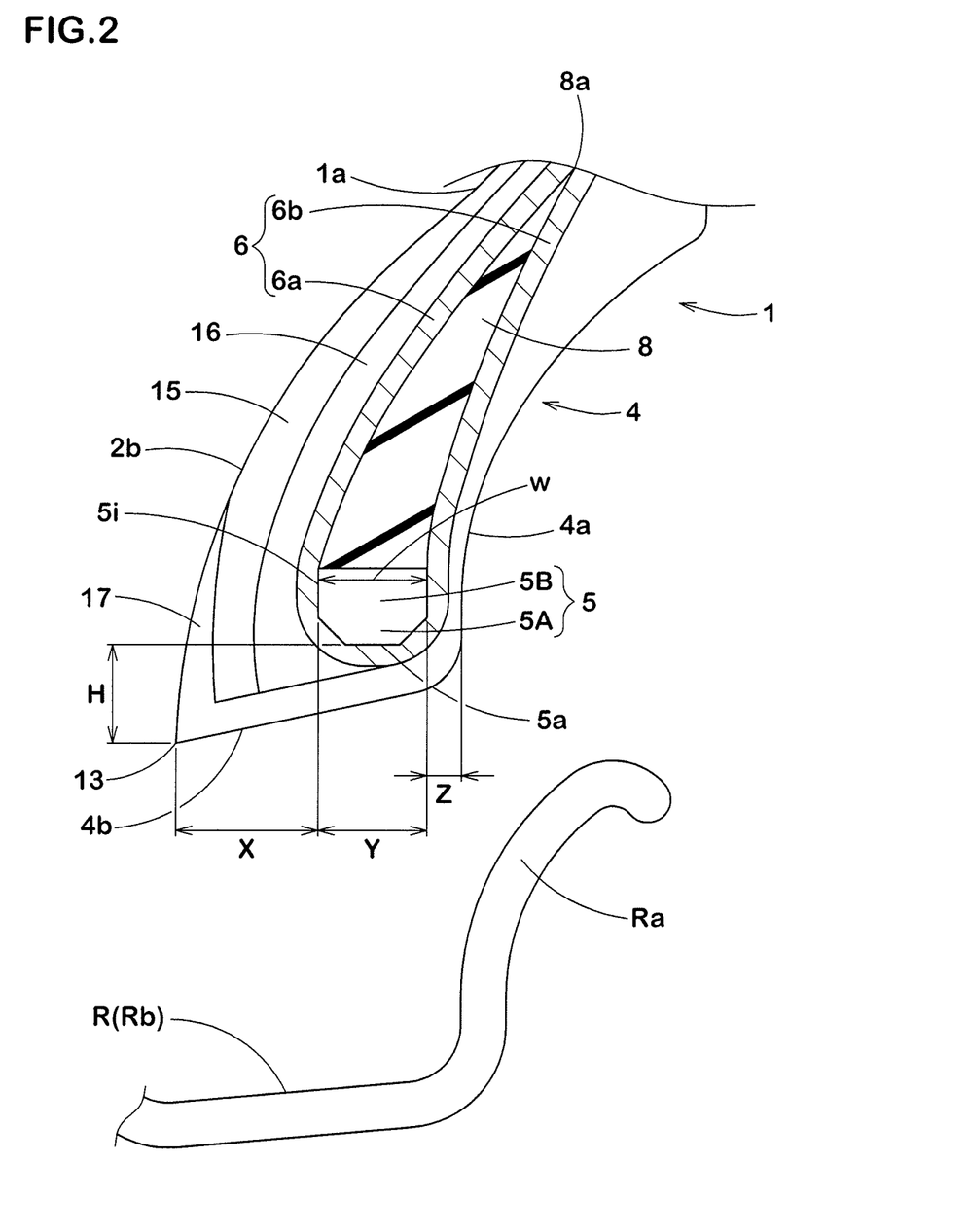
FIG. 2 is an enlarged view of one of bead portions of FIG. 1.

FIG. 2 is an enlarged view of one of the bead portions 4 of FIG. 1. As shown in FIG. 2, in at least one of the pair of the bead portions 4, a distance (H) in the tire radial direction between an inner end (5*a*) in the tire radial direction of the bead core 5 and the bead toe 13 is larger than 0.5 times and smaller than 2.5 times a maximum width (Y) in the tire axial direction of the bead core 5. Thereby, a preferable rubber volume is given to a part positioned on the inner side in the tire radial direction of the bead core 5, therefore, it is possible that this rubber is sufficiently deformed. Therefore, it becomes easy for the tire to engage with the rim (R), and the engagement property with the rim is improved. Further, in the tire 1 configured as such, during cornering, in a part on a side of the bead portion 4 where displacement is likely to occur, in the tire meridian section, torque rotating around the bead core 5 from the side of the base portion (Ra) to the side of the flange portion (Rb) of the rim (R). Thereby, the rubber is pressed toward the side of the flange portion (Rb) of the rim (R), therefore, the contact between the rubber and the rim (R) is increased, thereby, the steering stability is improved.

When the distance (H) is not more than 0.5 times the maximum width (Y), the rubber volume of a part on the inner side in the tire radial direction of the bead core 5 becomes small, therefore, the deformation of the rubber becomes small, thereby, the engagement property with the rim is deteriorated. When the distance (H) is not less than 2.5 times the maximum width (Y), the rubber volume becomes excessively large, therefore, the tightening force toward the flange portion (Rb) becomes small, thereby, the steering stability is deteriorated.

In this embodiment, in the bead portions 4 on both sides, the distance (H) is set to be larger than 0.5 times and smaller than 2.5 times the maximum width (Y).

In order to effectively exert the above-mentioned effects, it is preferred that the distance (H) is larger than 0.8 times and smaller than 2.0 times the maximum width (Y). It is further preferred that the distance (H) is in the range of from 1.0 to 1.7 times the maximum width (Y).

In each of the bead portions 4, it is preferred that a distance (X) in the tire axial direction between an inner end (5*i*) in the tire axial direction of the bead core 5 and the bead toe 13 is larger than 0.3 times and smaller than 2.0 times the maximum width (Y). When the distance (X) is not more than 0.3 times the maximum width (Y), the rubber volume of the part on the inner side in the tire axial direction of the bead core 5 becomes small, therefore, frictional force between the rubber and the base portion (Ra) becomes small. Thereby, during cornering, in the part on the side of the bead portion 4 where the displacement is likely to occur, it is possible that the displacement is caused by the torque. When the distance (X) is not less than 2.0 times the maximum width (Y), the rubber volume of the part on the inner side in the tire axial direction of the bead core 5 becomes excessively large, therefore, at the time of engagement with the rim (R), the frictional force between the rim (R) and the rubber on the inner side in the tire axial direction becomes large, thereby, it becomes difficult to engage with each other. In order to improve the engagement property with the rim and the steering stability in a good balance, it is further preferred that the distance (X) is in the range of from 0.8 to 1.5 times the maximum width (Y).

In each of the bead portions 4, it is preferred that a minimum length (Z) in the tire axial direction between the bead core 5 and the outer side surface (4*a*) is in the range of from 10% to 25% of the maximum width (Y). When the minimum length (Z) is less than 10% of the maximum width (Y), the rubber volume of the part on the outer side in the tire axial direction of the bead core 5 becomes small. Thereby, during cornering, the load applied to the apart on the axially outer side of the bead core 5 cannot be absorbed by the rubber, therefore, carcass cords (not shown) of the carcass 6 are damaged, thereby, it is possible that the steering stability is deteriorated, for example. When the minimum length (Z) is larger than 25% of the maximum width (Y), the rubber volume on the outer side in the tire axial direction becomes excessively large, therefore, in the engagement with the rim (R), the friction between the rim (R) and the rubber on the outer side in the tire axial direction becomes large, thereby, it becomes difficult for them to engage with each other.

Although it is not particularly limited, the maximum width (Y) is preferably in the range of from 4 to 10 mm, more preferably in the range of from 4.5 to 7.5 mm.

Each of the bead cores 5 has a width (W) in the tire axial direction increasing radially outwardly from the inner end (5*a*) in the tire radial direction of the bead core 5. Thereby, the rubber volume of the part on the inner side in the tire radial direction of the bead core 5 is maintained large, therefore, the engagement property with the rim is improved.

Each of the bead cores 5 in this embodiment is formed in a polygonal shape in the tire meridian section. Each of the bead cores 5 in this embodiment is formed in a hexagonal shape including a trapezoidal portion 5A in which the width (W) increases radially outwardly and a rectangular portion 5B arranged on the outer side in the tire radial direction of the trapezoidal portion 5A.

Figure 3:
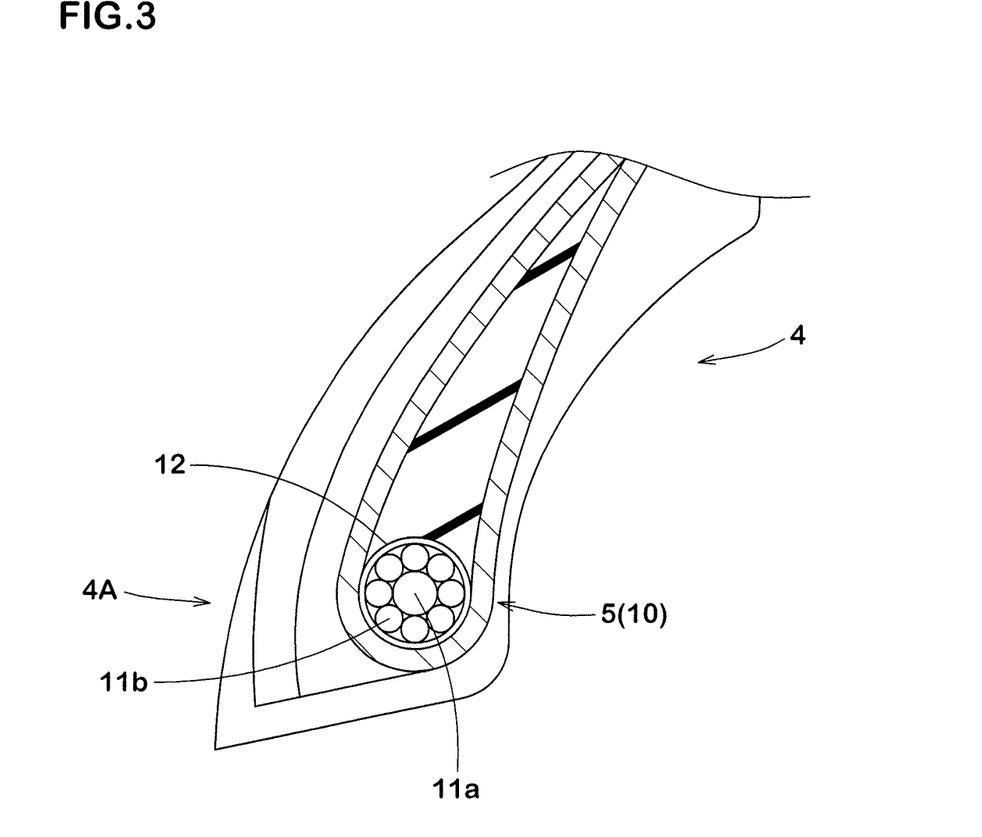
FIG. 3 is a cross-sectional view of one of the bead portions according to another embodiment of the present invention.

FIG. 3 is a cross-sectional view of one of the bead portions 4A according to another embodiment. As shown in FIG. 3, each of the bead cores 5 in this embodiment is formed to have a circular cross section, for example. Each of the bead cores 5 in this embodiment is formed by a cable bead 10. The cable bead 10 in this embodiment is formed of an annular core (11*a*) and one or more sheath wires (11*b*) wound helically around the annular core 11*a*. It is preferred that the core (11*a*) is made of a metal material such as iron having strength, or a low modulus synthetic resin material having a tensile elastic modulus of not more than 10 GPa such as nylon, polyvinyl alcohol, polyethylene terephthalate or the like, for example. It is preferred that the sheath wires (11*b*) are made of hard steel wires such as a piano wire material defined in Japanese Industrial standard JIS G3502 and a hard steel wire material defined in Japanese Industrial Standard JIS G3506, for example. Each of the bead cores 5 is covered by a wrapping sheet 12 having a cloth material using organic fiber cords (not shown), for example.

In-plane rigidity in the same plane direction (the tire radial direction) as the bead core 5 (the cable bead 10) is defined as in-plane rigidity (Si), and out-of-plane rigidity in a direction orthogonal to the same plane direction of the bead core 5 (cable bead 10) (the tire axial direction) is defined as out-of-plane rigidity (So). It is preferred that the in-plane rigidity (Si) and the out-of-plane rigidity (So) satisfy the following expression (1).

$$0.30 \leq So/Si \leq 0.70 \tag{1}$$

Thereby, it is possible that the bead portions 4 have preferred rigidity, therefore, the steering stability and the engagement property with the rim are improved in a good balance.

Figure 4A:
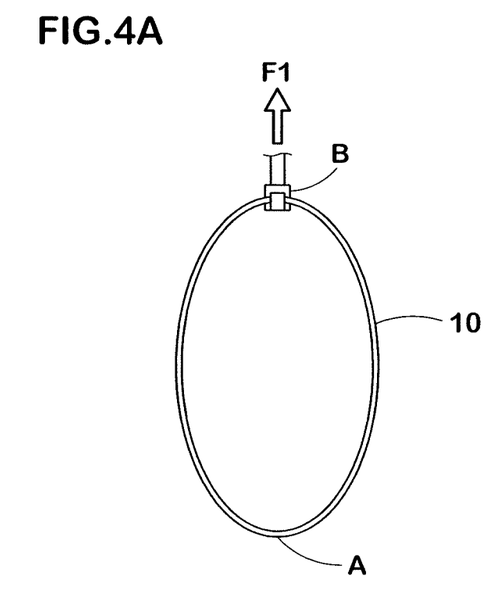
FIG. 4A is an explanatory diagram of a method of measuring in-plane rigidity of a cable bead.
Figure 4B:
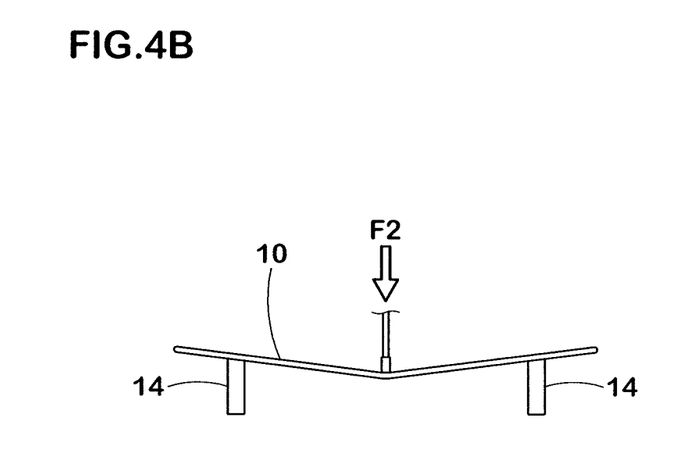
FIG. 4B is an explanatory diagram of a method of measuring out-of-plane rigidity of the cable bead.

Note that the in-plane rigidity (Si) and the out-of-plane rigidity (So) are measured by using an electromechanical universal testing machine available from Instron Co., Ltd. As shown in FIG. 4A, the in-plane rigidity (Si) is calculated by dividing force F1 (mN) by displacement (mm). The force (F1) is the force required to pull the cable bead 10 radially outwardly at a point (B) when the cable bead is fixed at a point (A) which is the symmetrical position of the point (A). Further, as shown in FIG. 4B, the out-of-plane rigidity (So) is calculated by dividing force F2 (mN) by displacement (mm). The force (F2) is the force applied to the cable bead 10 at a center portion between a pair of supporting bodies 14 which support the cable bead 10.

As shown in FIG. 2, the bead portions 4 in this embodiment include an inner liner 15, a tie gum layer 16, and chafer rubbers 17 arranged on the inner side in the tire axial direction of the bead cores 5.

The inner liner 15 in this embodiment forms an inner cavity surface (1a) of the tire 1 and extends continuously between the pair of the bead portions 4 in a toroidal manner. The inner liner 15 has air impermeability and it is preferred that the inner liner 15 is made of an elastomer composition containing a styrene-isobutylene-styrene block copolymer, for example.

The tie gum layer 16 in this embodiment is disposed between the inner liner 15 and the main body portion (6a) of the carcass 6. The tie gum layer 16 in this embodiment extends from the inner side in the tire radial direction of the inner end (5a) of the bead core 5 to the outer side in the tire radial direction of an outer end (8a) of the bead apex rubber 8.

The tie gum layer 16 in this embodiment has superior adhesiveness to the inner liner 15, and can effectively suppress separation between the inner liner 15 and the carcass 6.

Each of the chafer rubbers 17 in this embodiment forms the inner cavity surface (1a), respective one of the outer side surfaces (4a), and respective one of the bead bottom surfaces (4b), and is formed in a substantially U-shape so as to surround respective one of the bead cores 5. It is possible that the chafer rubbers 17 prevent the displacement between the bead portions 4 and the rim (R).

The inner liner 15, the tie gum layer 16, and the chafer rubbers 17 have rubber hardness preferably in the range of from 45 to 75 degrees, more preferably in the range of from 50 to 70 degrees. In this specification, the term "rubber hardness" means hardness measured by a type-A durometer under an environment of 23 degrees Celsius in accordance with Japanese Industrial Standard JIS-K 6253.

While detailed description has been made of the tire as an especially preferred embodiment of the present invention, the present invention can be embodied in various forms without being limited to the illustrated embodiment.

Working Examples (Examples)

Pneumatic tires for a motorcycle of size 180/55ZR17 having the basic structure shown in FIG. 1 were made by way of test according to the specifications listed in Table 1, then the test tires were tested for the steering stability and the engagement property with the rim. The test methods were as follows.

The rubber hardness shown in the table is the rubber hardness of the inner liner, the tie gum, and the chafer rubber.

<Steering Stability>

Each of the test tires was mounted on a rear wheel of a motorcycle with displacement of 1300 cc under the following conditions. Note that a commercial tire was mounted on a front wheel of the test motorcycle. Then, a test rider drove the test motorcycle on a dry asphalt road surface, and running characteristics related to steering response, rigid impression, grip force, etc. during cornering were evaluated by the test rider's feeling. The results are indicated by an evaluation point based on Reference 1 being 100 wherein a larger numerical value is better. It is judged as effective if there is a difference not less than 5 points as compared with the result of the Reference 1.

Rim: 17M/C×MT5.50
Tire inner pressure: 290 kPa
Cornering radius: 400 m
Cornering speed: 220 km/h <Engagement Property with Rim>

In mounting each of the test tires on the rim, air was gradually injected and the pressure (engagement pressure) when the bead portions got over humps of the rim was measured.

The results were indicated by an index which is a value obtained by dividing the pressure of each of Examples and each of References by the pressure of Reference 1 and then multiplying by 100, wherein a smaller numerical value is better. It is judged as effective if there is a difference not less than 5 points as compared with the result of the Reference 1.

The test results are shown in Table 1.

TABLE 1

|  | Ref. 1 | Ref. 2 | Ex. 1 | Ex. 2 | Ex. 3 | Ex. 4 | Ex. 5 |
| --- | --- | --- | --- | --- | --- | --- | --- |
| Distance (H)/Maximum width (Y) [times] | 0.5 | 2.5 | 1.4 | 1.4 | 0.8 | 2.0 | 1.4 |
| Maximum width (Y) [mm] | 6 | 6 | 5 | 5 | 5 | 5 | 5 |
| Distance (X)/Maximum width (Y) [times] | 0.3 | 1.2 | 1.2 | 1.2 | 1.2 | 1.2 | 0.3 |
| Cross-sectional shape of Bead core | circular | FIG. 2 | circular | FIG. 2 | circular | circular | circular |
| Distance (Z)/Maximum width (Y) [%] | 40 | 40 | 18 | 18 | 18 | 18 | 18 |
| Cable bead or not | not | not | cable bead | not | cable bead | cable bead | cable bead |
| Out-of-plane rigidity (So)/In-plane rigidity (Si) | 0.88 | 0.59 | 0.59 | 0.76 | 0.59 | 0.59 | 0.59 |
| Out-of-plane rigidity (So) [mN/mm] | 300 | 200 | 200 | 260 | 200 | 200 | 200 |

TABLE 1-continued

|  | | | | | | | |
|---|---|---|---|---|---|---|---|
| Rubber hardness [degree] | 65 | 50 | 50 | 50 | 50 | 50 | 50 |
| Steering stability [evaluation point: larger is better] | 100 | 80 | 140 | 135 | 130 | 130 | 125 |
| Engagement property with Rim [index: smaller is better] | 100 | 70 | 75 | 80 | 85 | 85 | 80 |

|  | Ex. 6 | Ex. 7 | Ex. 8 | Ex. 9 | Ex. 10 | Ex. 11 | Ex. 12 |
|---|---|---|---|---|---|---|---|
| Distance (H)/Maximum width (Y) [times] | 1.4 | 1.4 | 1.4 | 1.4 | 1.4 | 1.4 | 1.4 |
| Maximum width (Y) [mm] | 5 | 5 | 5 | 5 | 5 | 5 | 5 |
| Distance (X)/Maximum width (Y) [times] | 2.0 | 2.0 | 2.0 | 2.0 | 2.0 | 2.0 | 2.0 |
| Cross-sectional shape of Bead core | circular | circular | circular | circular | circular | circular | circular |
| Distance (Z)/Maximum width (Y) [%] | 18 | 8 | 10 | 25 | 30 | 18 | 18 |
| Cable bead or not | cable bead | cable bead | cable bead | cable bead | cable bead | cable bead | cable bead |
| Out-of-plane rigidity (So)/In-plane rigidity (Si) | 0.59 | 0.59 | 0.59 | 0.59 | 0.59 | 0.27 | 0.76 |
| Out-of-plane rigidity (So) [mN/mm] | 200 | 200 | 200 | 200 | 200 | 120 | 260 |
| Rubber hardness [degree] | 50 | 50 | 50 | 50 | 50 | 85 | 85 |
| Steering stability [evaluation point: larger is better] | 135 | 120 | 125 | 130 | 130 | 125 | 120 |
| Engagement property with Rim [index: smaller is better] | 85 | 80 | 80 | 85 | 90 | 85 | 80 |

As is clear from the Table 1, it was confirmed that the steering stability and the engagement property with the rim were improved in a significantly good balance for the pneumatic tires as the Examples as compared with the References.

The invention claimed is:

1. A pneumatic tire, comprising:
a pair of bead portions each having a bead core therein,
wherein each of the pair of the bead portions has an outer side surface which is to be in contact with a standard rim on an outer side in a tire axial direction of the respective one of the bead cores,
in a tire meridian section of the pneumatic tire in a pre-mounted state in which a width between the outer side surfaces is equal to a rim width of the standard rim, in at least one of the pair of the bead portions, a distance (H) in a tire radial direction between an inner end in the tire radial direction of the bead core and a bead toe is larger than 0.5 times and smaller than 2.5 times a maximum width (Y) in the tire axial direction of the bead core, and
when measured at a radial height of the axially outer end of the bead core, a minimum length in the tire axial direction between an axially outer end of the bead core and the outer side surface is in a range of from 10% to 25% of the maximum width (Y).

2. The pneumatic tire according to claim 1,
wherein a width in the tire axial direction of each of the bead cores increases radially outwardly from the inner end of respective one of the bead cores.

3. The pneumatic tire according to claim 1,
wherein the distance (H) is larger than 0.8 times and smaller than 2.0 times the maximum width (Y).

4. The pneumatic tire according to claim 1,
wherein a distance (X) between the inner end in the tire axial direction of the bead core and the bead toe is larger than 0.3 times and smaller than 2.0 times the maximum width (Y).

5. The pneumatic tire according to claim 1,
wherein in a radial cross-sectional view, each of the bead cores is formed in a hexagonal shape consisting of a trapezoidal portion in which an axial width thereof increases radially outwardly and a rectangular portion arranged on a radially outer side of the trapezoidal portion.

6. The pneumatic tire according to claim 1,
wherein each of the bead cores has a circular cross section.

7. The pneumatic tire according to claim 6,
wherein each of the bead cores is formed by a cable bead, and
the cable bead is formed of an annular core and one or more sheath wires wound helically around the annular core.

8. The pneumatic tire according to claim 7,
wherein in-plane rigidity (Si) and out-of-plane rigidity (So) satisfy a following expression (1):

$$0.30 \leq So/Si \leq 0.70 \qquad (1).$$

9. The pneumatic tire according to claim 1,
wherein the bead portions include an inner liner, a tie gum layer, and chafer rubbers each arranged axially inside the respective bead core, and
the inner liner forms an inner cavity surface of the tire and extends continuously between the bead portions in a toroidal manner.

10. A pneumatic tire, comprising:
a pair of bead portions each having a bead core therein,
wherein each of the pair of the bead portions has an outer side surface which is to be in contact with a standard rim on an outer side in a tire axial direction of the respective one of the bead cores,
in a tire meridian section of the pneumatic tire in a pre-mounted state in which a width between the outer side surfaces is equal to a rim width of the standard rim, in at least one of the pair of the bead portions, a distance (H) in a tire radial direction between an inner end in the tire radial direction of the bead core and a bead toe is larger than 0.5 times and smaller than 2.5 times a maximum width (Y) in the tire axial direction of the bead core, and each of the bead cores has a circular cross section with a plurality of sheath wires wound helically around the annular core, the bead core being covered by a wrapping sheet having a cloth material using organic fiber cords, wherein a minimum length in the tire axial direction between the bead core and the outer side surface is in a range of from 10% to 25% of the maximum width (Y).

11. The pneumatic tire according to claim 10, wherein a width in the tire axial direction of each of the bead cores increases radially outwardly from the inner end of respective one of the bead cores.

12. The pneumatic tire according to claim 10, wherein the distance (H) is larger than 0.8 times and smaller than 2.0 times the maximum width (Y).

13. The pneumatic tire according to claim 10, wherein a distance (X) between the inner end in the tire axial direction of the bead core and the bead toe is larger than 0.3 times and smaller than 2.0 times the maximum width (Y).

14. A pneumatic tire, comprising:
a pair of bead portions each having a bead core therein,
wherein each of the pair of the bead portions has an outer side surface which is to be in contact with a standard rim on an outer side in a tire axial direction of the respective one of the bead cores, in a tire meridian section of the pneumatic tire in a pre-mounted state in which a width between the outer side surfaces is equal to a rim width of the standard rim, in at least one of the pair of the bead portions, a distance (H) in a tire radial direction between an inner end in the tire radial direction of the bead core and a bead toe is larger than 0.5 times and smaller than 2.5 times a maximum width (Y) in the tire axial direction of the bead core, and a tread width is a distance between tread edges in the tire axial direction and is a maximum width of the tire.

15. The pneumatic tire according to claim 14, wherein a width in the tire axial direction of each of the bead cores increases radially outwardly from the inner end of respective one of the bead cores.

16. The pneumatic tire according to claim 14, wherein the distance (H) is larger than 0.8 times and smaller than 2.0 times the maximum width (Y).

17. The pneumatic tire according to claim 14, wherein a distance (X) between the inner end in the tire axial direction of the bead core and the bead toe is larger than 0.3 times and smaller than 2.0 times the maximum width (Y).

18. The pneumatic tire according to claim 14, wherein a minimum length in the tire axial direction between the bead core and the outer side surface is in a range of from 10% to 25% of the maximum width (Y).

* * * * *